(12) United States Patent
Miyazaki et al.

(10) Patent No.: US 8,485,904 B2
(45) Date of Patent: Jul. 16, 2013

(54) OPERATION DEVICE

(75) Inventors: Yoshio Miyazaki, Kanagawa (JP);
Takamasa Araki, Tokyo (JP);
Kazuyoshi Enomoto, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 44 days.

(21) Appl. No.: 13/017,235

(22) Filed: Jan. 31, 2011

(65) Prior Publication Data

US 2011/0195783 A1    Aug. 11, 2011

(30) Foreign Application Priority Data

Feb. 9, 2010   (JP) .................................. 2010-026912
Feb. 9, 2010   (JP) .................................. 2010-026913

(51) Int. Cl.
*A63F 9/24* (2006.01)
(52) U.S. Cl.
USPC ............................................................ 463/37
(58) Field of Classification Search
USPC ............................................................ 463/37
See application file for complete search history.

(56) References Cited

U.S. PATENT DOCUMENTS

| 2,457,421 | A | | 12/1948 | Warren |
| 5,805,140 | A | * | 9/1998 | Rosenberg et al. ............ 345/161 |
| 6,081,993 | A | * | 7/2000 | Rankin ............................ 29/756 |
| 6,843,594 | B1 | | 1/2005 | Moteki et al. |
| 2008/0174550 | A1 | | 7/2008 | Laurila et al. |
| 2009/0023499 | A1 | * | 1/2009 | Mao ................................. 463/39 |
| 2009/0278800 | A1 | * | 11/2009 | Deliwala ....................... 345/158 |

FOREIGN PATENT DOCUMENTS

| CN | 1237250 | 12/1999 |
| GB | 707179 | 4/1954 |
| JP | 5-84812 | 11/1993 |
| JP | 2003-298254 | 10/2003 |
| JP | 2004-64302 | 2/2004 |
| JP | 2005-259376 | 9/2005 |
| JP | 2010-15535 | 1/2010 |

OTHER PUBLICATIONS

European Search Report dated Aug. 22, 2011, from corresponding European Application No. 11 00 0911.
Akira Yamaguchi, et al. "A Faraday Magnetometer for Studies of 3He Films on Graphite" Journal of Physics and Chemistry of Solids, vol. 66, No. 8-9, Aug. 1, 2005.
Japanese Office Action dated Jan. 31, 2012, from corresponding Japanese Application No. 2010-026913.
Japanese Office Action dated Jan. 31, 2012, from corresponding Japanese Application No. 2010-026912.
Chinese First Office Action dated Jan. 28, 2013, from corresponding Chinese Application No. 201110034058.4.

* cited by examiner

*Primary Examiner* — Corbett B Coburn
(74) *Attorney, Agent, or Firm* — Katten Muchin Rosenman LLP

(57) ABSTRACT

Provided is an operation device, including: a magnetic sensor (21); and an operation button (14) used for operation input by a user, in which the operation button (14) has a spring (14a) integrated therein, and the spring (14a) is formed of a non-magnetic material.

6 Claims, 6 Drawing Sheets

OPERATION DEVICE

BACKGROUND OF THE INVENTION

1. Field of the Invention

The present invention relates to an operation device including an operation button and a magnetic sensor (magnetometer).

2. Description of the Related Art

There are known various operation devices for receiving operation input from a user, such as a controller of a video game console. The user operates an operation button or the like provided to the operation device, to thereby input various kinds of instructions to an information processing apparatus. Further, some of the operation devices are provided with a posture detecting function. With the use of an operation device provided with the posture detecting function, the user can perform operation input not only by operating a button provided to the operation device but also by tilting or moving the operation device itself to change its posture.

Magnetic sensors are known as means for implementing detection of the posture of the operation device. The magnetic sensor is a sensor capable of detecting an orientation of the Earth's magnetic field. By utilizing a detection result thereof, it is possible to identify a change in orientation of the operation device equipped with the magnetic sensor.

SUMMARY OF THE INVENTION

The inventors of the subject application have found that there is a case where, when posture detection is performed with an operation device equipped with a magnetic sensor, a user's operation performed with respect to an operation button influences a detection result of the magnetic sensor. Such an influence exerted by the user's operation possibly causes an error when the posture detection is performed with the use of the magnetic sensor.

In view of the above-mentioned circumstances, the present invention has been made, and therefore has an object to provide an operation device that includes an operation button and a magnetic sensor and is capable of suppressing a measurement error of the magnetic sensor, which is caused by a user's operation performed with respect to the operation button.

According to one aspect of the present invention, there is provided an operation device, including: a magnetic sensor; and an operation button used for operation input by a user, in which the operation button has a spring integrated therein, and the spring is formed of a non-magnetic material.

Further, the non-magnetic material may include phosphor bronze.

Further, the spring may be operated in a direction toward the magnetic sensor along with an operation performed on the operation button by the user.

Further, the operation device may further include a board disposed inside an enclosure of the operation device, in which: the magnetic sensor may be disposed on one of surfaces of the board; and the operation button may be disposed on the same side of the board as the magnetic sensor.

Further, the magnetic sensor and the spring may be disposed at positions that overlap each other when viewed from a direction perpendicular to the one of the surfaces of the board.

Further, according to another aspect of the present invention, there is provided an operation device, including: a magnetic sensor; an operation button used for operation input by a user; and a board, in which: the board has a shape extending in one direction, and one of end portions thereof is fixed to an enclosure of the operation device with a fastening member; and the magnetic sensor and a contact point of the operation button are both disposed at positions close to the one of the end portions on the board.

Further, in the operation device, the fastening member may include a screw formed of a non-magnetic material.

Further, the screw may fix the board at a position distanced from the magnetic sensor by 15 mm or shorter.

Further, the fastening member may fasten the board to the enclosure with a fastening force applied in a direction substantially parallel to an operation direction in which the user operates the operation button.

Further, the fastening member may fasten the board to the enclosure with the fastening force applied in a direction opposite to the operation direction.

Further, in the operation device, the operation input by the user may include a change in posture of the operation device, and the one of the end portions of the board may be an end portion closer to a reference position used when the posture of the operation device is detected.

Further, the board may have corner portions in the one of the end portions thereof fixed to the enclosure of the operation device.

DETAILED DESCRIPTION OF THE INVENTION

Hereinbelow, with reference to the drawings, detailed description is given of an embodiment of the present invention.

Figure 1:
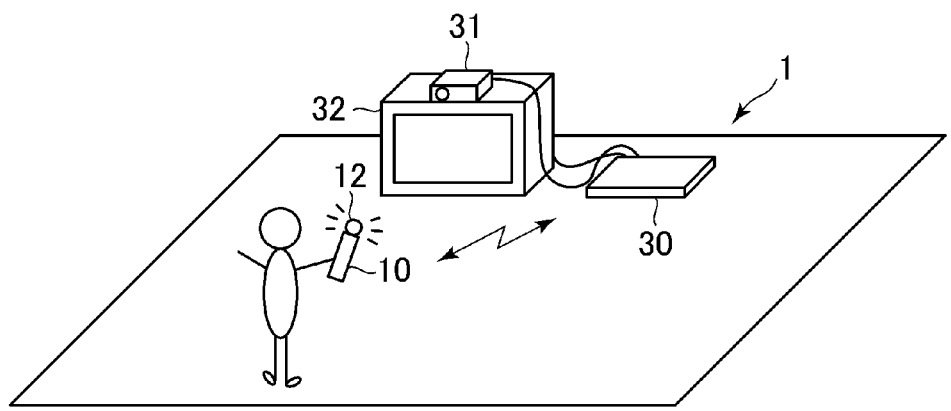
FIG. 1 is a schematic diagram illustrating an overview of an information processing system including an operation device according to an embodiment of the present invention.

FIG. 1 is a schematic diagram illustrating a use situation of an information processing system 1 including an operation device 10 according to the embodiment of the present invention. As illustrated in FIG. 1, the information processing system 1 includes the operation device 10 to be held by a user with his/her hand when used and an information processing apparatus 30. The information processing apparatus 30 is, for example, a video game console, a personal computer, or the like, and is connected to an image capture apparatus 31 and a display apparatus 32.

The operation device 10 is capable of establishing communication to the information processing apparatus 30 via a wireless communication interface compliant with, for example, the Bluetooth (registered trademark) standard. The user of the information processing system 1 holds the operation device 10 with his/her hand to operate an operation button or the like provided to the operation device 10. In response to such an operation, a content of the operation performed by the user is transmitted to the information processing apparatus 30 via the wireless communication interface. Further, in this embodiment, the operation device 10 includes a light emitting portion 12, which emits light according to an instruction from the information processing apparatus 30. The image capture apparatus 31 captures an image of the light emitted from the light emitting portion 12, and then outputs the captured image to the information processing apparatus 30. In addition, as described later, the operation device 10 includes a plurality of kinds of sensors, and transmits detection results of those sensors to the information processing apparatus 30. By using the position and the size of the light emitting portion 12 in the image captured by the image capture apparatus 31 and the detection results of the sensors integrated in the operation device 10, the information processing apparatus 30 identifies the posture (position, orientation or the like) of the operation device 10. With this configuration, the user can perform operation input with respect to the information processing apparatus 30 not only by operating the operation button or the like provided to the operation device 10 but also by moving the operation device 10 itself.

Figure 2:
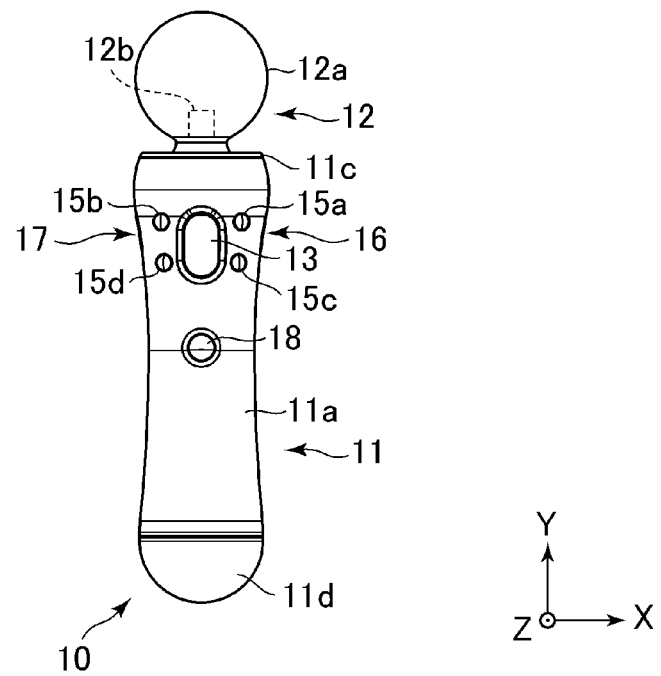
FIG. 2 is a front view of the operation device.
Figure 3:
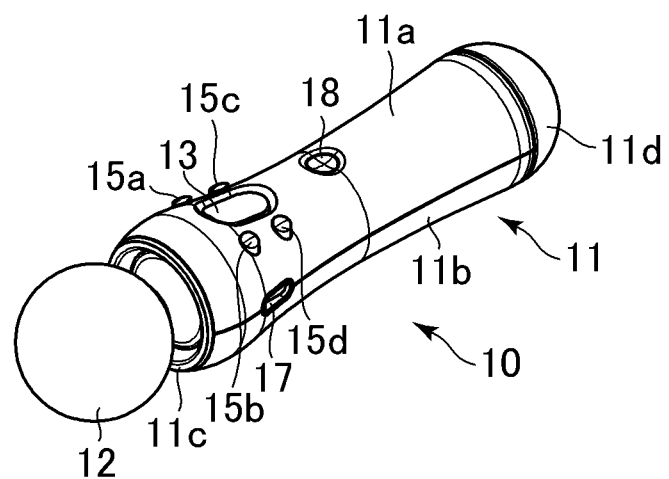
FIG. 3 is a perspective view of the operation device when viewed from a front side thereof.
Figure 4:
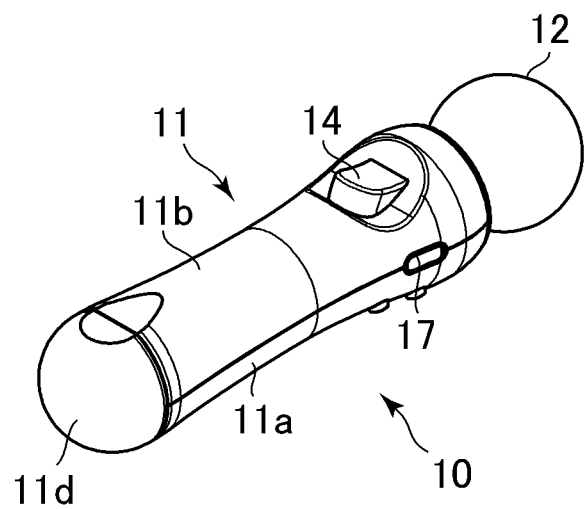
FIG. 4 is a perspective view of the operation device when viewed from a back side thereof.

Next, a structure of the operation device 10 is described. FIGS. 2 to 4 are views each illustrating an outer appearance of the operation device 10. FIG. 2 is a front view of the operation device 10. FIG. 3 is a perspective view of the operation device 10 when viewed from a front side thereof. FIG. 4 is a perspective view of the operation device 10 when viewed from a back side thereof. As illustrated in FIGS. 2 to 4, the operation device 10 includes a main body portion 11 and the light emitting portion 12, and the main body portion 11 is provided with a plurality of operation buttons on a side surface thereof. The user holds substantially the center of the main body portion 11, and performs operation input by depressing the operation buttons with his/her thumb and fingers. Note that, hereinbelow, a horizontal direction of the operation device 10 is represented by an X-axis, a vertical direction (longitudinal direction) thereof is represented by a Y-axis, and an anteroposterior direction thereof is represented by a Z-axis.

The main body portion 11 is formed in a column shape as a whole, and has the light emitting portion 12 attached to one end thereof. Specifically, an enclosure of the main body portion 11 is formed of a front portion 11a, a back portion 11b, a top portion 11c, and a bottom portion 11d. The front portion 11a and the back portion 11b each have a shape obtained by cutting a cylinder in half along its longitudinal direction. Those portions are combined together to form the side surface of the main body portion 11 having a cylindrical shape. The top portion 11c is formed in a disk shape having an opening at its center. Through the opening, the light emitting portion 12 is connected to a board 20 integrated in the main body portion 11. The bottom portion 11d is formed in a semi-spherical shape.

The light emitting portion 12 includes a spherical outer shell 12a formed of a light transmissive material, such as a silicone resin, and a plurality of LEDs 12b disposed therein-side. In this embodiment, three LEDs 12b corresponding to the three primary colors of light each emit light with an intensity corresponding to an instruction from the information processing apparatus 30, thereby enabling the light emitting portion 12 to emit light with various colors.

On the surface of the enclosure of the main body portion 11, as the operation buttons to be operated by the user, there are disposed a main button 13, a trigger button 14, auxiliary buttons 15a to 15d, a start button 16, a select button 17, and a power button 18. Specifically, the main button 13, the auxiliary buttons 15a to 15d, and the power button 18 are disposed in respective openings formed in the front portion 11a. The trigger button 14 is disposed in an opening formed in the back portion 11b. Further, the start button 16 and the select button 17 are disposed at positions on boundaries between the front portion 11a and the back portion 11b. Hereinbelow, description is given of a disposition of those operation buttons.

The main button 13 is disposed, on the front side of the operation device 10, at a position at which the thumb is placed when the user holds the operation device 10 with his/her hand. The trigger button 14 is disposed on the back side of the operation device 10 (that is, side opposite to the side where the main button 13 is disposed) so as to be opposed to the main button 13. The user holds a portion in the vicinity of the center of the main body portion 11, and can operate the trigger button 14 with his/her index finger while operating the main button 13 with his/her thumb. Note that, instead of simply outputting binary information indicating whether or not the button is depressed by the user, the trigger button 14 is capable of detecting a degree to which the button is depressed by the user and outputting information indicating a depression amount.

Around the main button 13, the four auxiliary buttons 15a to 15d are disposed so as to surround the main button 13. Those auxiliary buttons 15a to 15d are used for various kinds of operation input along with the main button 13 during execution of an application program.

The start button 16 and the select button 17 are used by the user to start a game, make a selection, make a pause, etc. when the information processing apparatus 30 executes a game application program, for example. The start button 16 is disposed on a right side surface of the main body portion 11, whereas the select button 17 is disposed on a left side surface of the main body portion 11 so as to be opposed to the start button 16.

The power button 18 is disposed, at the front of the main body portion 11, below the position at which the main button 13 is disposed. The power button 18 is used for powering on the operation device 10 to start operation thereof or powering off the operation device 10 to terminate the operation.

Figure 5:
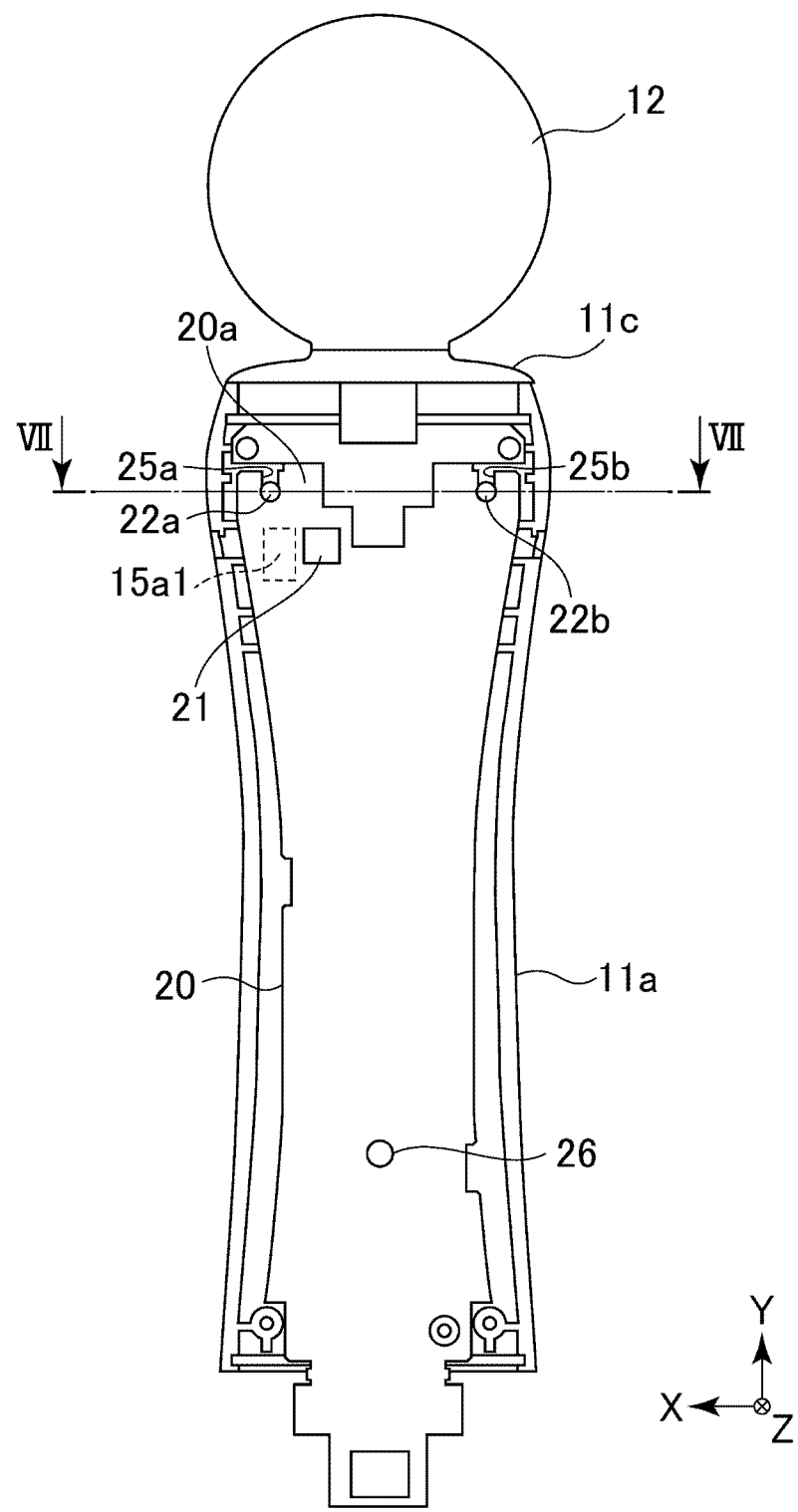
FIG. 5 is a diagram illustrating a disposition of a board inside the operation device.

Further, the board 20 is disposed inside the main body portion 11. FIG. 5 is a diagram illustrating a disposition of the board 20 inside the operation device 10. FIG. 5 illustrates a view from the back side of the operation device 10, in which the bottom portion 11d and the back portion 11b constituting the enclosure of the main body portion 11 are removed from the operation device 10. As illustrated in FIG. 5, the board 20 has a substantially rectangular shape, and is disposed in parallel to the X-axis and the Y-axis of the operation device 10.

As illustrated in FIG. 5, a magnetic sensor 21 is disposed on a surface of the board 20 on the back side of the operation device 10. In this embodiment, the magnetic sensor 21 is a three-axis magnetic sensor, which detects, with an XY plane, a YZ plane, and a ZX plane of the operation device 10 set as reference planes, orientations of the Earth's magnetic field with respect to the respective reference planes. By analyzing a temporal change in detection result of the Earth's magnetic field for each plane, it is possible to identify a change in orientation of the operation device 10. Note that, though not illustrated, the operation device 10 also has an acceleration sensor and a gyroscope integrated therein as sensors for detecting the posture and the movement of the operation device 10, in addition to the magnetic sensor 21.

Figure 6:
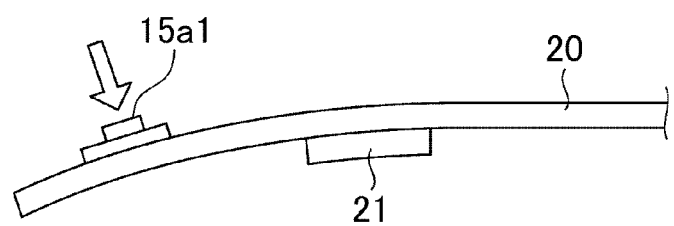
FIG. 6 is an explanatory diagram schematically illustrating an influence on a magnetic sensor, which is exerted by an operation with respect to an operation button.

Further, on a surface of the board 20 on the front side of the operation device 10, there are disposed contact points for the main button 13, the auxiliary buttons 15a to 15d, and the power button 18. Because the contact points are disposed on the board 20, when the user performs operations of depressing those buttons, forces are applied to the board 20. Then, when a force is applied to a contact point disposed at a position close to the position of the magnetic sensor 21 on the board 20, a slight deformation is conceivably caused in the board 20 by this force, influencing measurement results of the magnetic sensor 21. FIG. 6 is an explanatory diagram schematically illustrating a change in orientation of the magnetic sensor 21, which possibly occurs due to the above-mentioned deformation of the board 20. As an example, FIG. 6 illustrates a case where a force is applied to a contact point 15a1 of the auxiliary button 15a. Note that, in FIG. 6, the deformation of the board 20 is illustrated in an exaggerating manner for the convenience of description. Fluctuations in measurement results of the magnetic sensor 21, which are caused by such an influence as described above, occur despite a fact that the orientation of the operation device 10 itself has not been changed. Therefore, in a case where the posture of the operation device 10 is detected by using the measurement results of the magnetic sensor 21, measurement errors are caused by the fluctuations.

Such measurement errors of the magnetic sensor 21 are thought to occur when a particular button, whose contact point is disposed at a position relatively closer to the magnetic sensor 21 on the board 20, is operated among the plurality of the operation buttons provided to the operation device 10. Such an operation button may be the main button 13 and the auxiliary buttons 15a to 15d, for example. In particular, the contact point 15a1 of the auxiliary button 15a is disposed at a position on the right-hand side of the board 20 when viewed from a front side of the board 20, which thus substantially corresponds to the position at which the magnetic sensor 21 is disposed on a back side of the board 20. Accordingly, the contact point 15a1 is the closest to the magnetic sensor 21. In view of this, the influence of an operation performed with respect to the auxiliary button 15a is expected to be large. Note that, in FIG. 5, the position of the contact point 15a1 when viewed from the back side of the board 20 is indicated by broken lines. In order to avoid such measurement errors, it is conceivable to make larger a distance between the contact point of each operation button and the magnetic sensor 21 on the board 20. However, there are limitations on the size of the board 20 and on a circuit layout on the board 20 in terms of mounting, and hence there is a case where it is impossible to secure a sufficient distance between the magnetic sensor 21 and the contact point of each operation button. In particular, in this embodiment, the light emitting portion 12 serves as a reference position for detecting the posture of the operation device 10. In other words, a change in posture of the light emitting portion 12 is detected as a change in posture of the operation device 10. In this case, if the user holds a position distanced too much from the light emitting portion 12, it is difficult to obtain a desired posture detection result as the user wishes even when the user performs an operation of changing the posture of the operation device 10. To address this, such operation buttons as the auxiliary button 15a, which are to be operated with a hand with which the user is holding the operation device 10, tend to be concentrated in the vicinity of the light emitting portion 12 serving as the reference position for the posture detection. Meanwhile, such sensors as the magnetic sensor 21, which are used for the posture detection, are also desirably disposed at positions close to the reference position for the posture detection. In view of the above, in this embodiment, the magnetic sensor 21 and the contact points of the main button 13 and the auxiliary buttons 15a to 15d are all disposed at positions on a closer side of the board 20 to the light emitting portion 12, relative to the center of the board 20.

In order to suppress the occurrence of the above-mentioned measurement errors, in this embodiment, there is employed a structure that prevents deformation of the board 20 from occurring even when such operation buttons as the main button 13 and the auxiliary buttons 15a to 15d are operated. Specifically, the board 20 has an elongated shape extending in one direction (here, Y-axis direction) as illustrated in FIG. 5, and one end portion thereof (here, end portion 20a on a positive Y-axis direction side, that is, on a light emitting portion 12 side) is fixed to the enclosure of the main body portion 11 with fastening members. The magnetic sensor 21 and the contact points of operation buttons expected to influence the detection results of the magnetic sensor 21 are all disposed at positions on the closer side of the board 20 to the end portion 20a, relative to the center of the board 20. Thus, the end portion 20a is fixed, and hence deformation can be prevented from occurring in the board 20, thereby preventing the user's operation performed with respect to the auxiliary button 15a or the like from influencing the detection results of the magnetic sensor 21.

Figure 7:
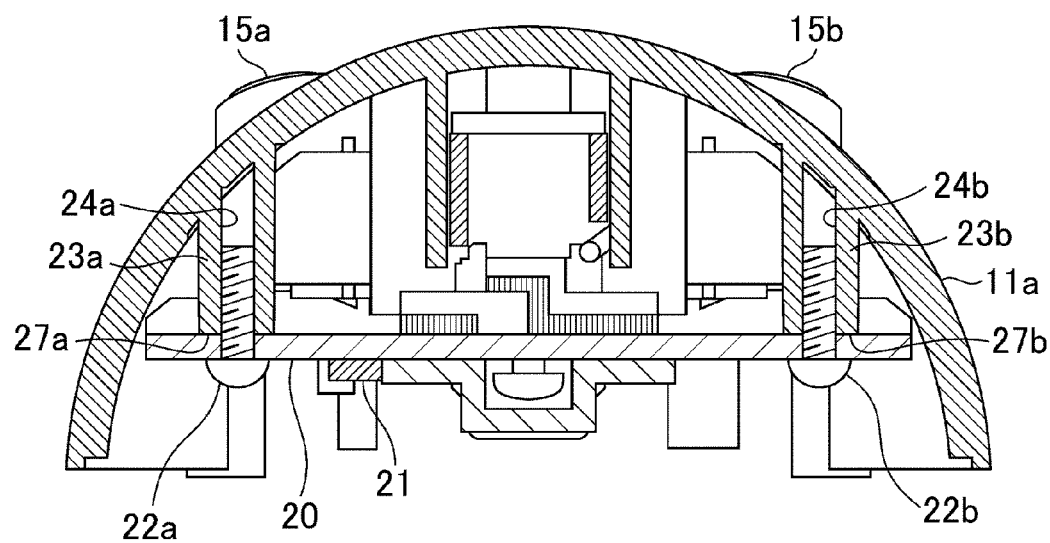
FIG. 7 is a cross section taken along the VII-VII line of FIG. 5.

Specifically, the board 20 is fixed to the front portion 11a constituting the enclosure of the main body portion 11 with screws 22a and 22b serving as the fastening members. With the screws 22a and 22b, corner portions of the end portion 20a of the board 20, which are located at the upper right and the upper left of the board 20 when viewed from the front side thereof, are fastened to the front portion 11a. In other words, the end portion 20a of the board 20 is fixed with the screws 22a and 22b along a direction parallel to a direction in which the magnetic sensor 21 and the contact point 15a1 are aligned. FIG. 7 is a cross section taken along the VII-VII line of FIG. 5, and illustrates a view in which the board 20 is fixed to the front portion 11a with the screws 22a and 22b. As illustrated in FIG. 7, the front portion 11a is provided with screw receiving portions 23a and 23b that have a cylindrical shape extending in a direction perpendicular to the board 20 (Z-axis direction), and the screw receiving portions 23a and 23b have screw holes 24a and 24b formed thereinside. Further, as illustrated in FIG. 5, the end portion 20a of the board 20 is provided with U-shaped notches 25a and 25b at two positions thereof respectively corresponding to the screw holes 24a and 24b. The screw 22a is inserted into the screw hole 24a through the notch 25a, and the screw 22b is inserted into the screw hole 24b through the notch 25b, thereby fastening the end portion 20a of the board 20 to the front portion 11a. Note that, as illustrated in FIG. 5, a hole 26 for a screw is formed at a position slightly below the center of the board 20, and hence, apart from the screws 22a and 22b, the board 20 is further fastened to the front portion 11a with another screw (not shown) through the hole 26. Specifically, this screw jointly fastens a bracket of a battery to be integrated in the main body portion 11 and the board 20 to the front portion 11a. In this manner, the board 20 is fixed to the front portion 11a.

Here, the screws 22a and 22b are respectively inserted into the screw holes 24a and 24b in a direction (negative Z-axis direction) that is substantially parallel to an operation direction in which the user operates such operation buttons as the auxiliary button 15a which possibly cause deformation in the board 20 and that is also opposite to the operation direction (that is, positive Z-axis direction). Therefore, the screws 22a and 22b fasten the board 20 to the front portion 11a with fastening forces applied in the direction that is substantially parallel to and also opposite to the operation direction of the operation buttons. With this structure, even when the auxiliary button 15a or the like is operated, deformation is less liable to occur in the board 20. In addition, as illustrated in FIG. 7, both the screw receiving portions 23a and 23b have a cylindrical shape with a thick wall, and planes 27a and 27b are respectively formed at portions of edges thereof, which are brought into contact with the board 20. The planes 27a and 27b are formed so as to be in parallel to the board 20, and are thus substantially perpendicular to the operation direction of the auxiliary button 15a or the like. By making the planes 27a and 27b in contact with the board 20 as described above, deformation becomes further less liable to occur in the board 20.

In general, it is a known fact that when a magnetic material exists in the vicinity of the magnetic sensor, there is a fear that the magnetic material influences the measurement results of the magnetic sensor. Thus, in a case where the magnetic sensor is disposed on the board, normally, the board is not fastened with a screw at a position in the vicinity of the magnetic sensor, but instead is fastened with a screw at a position distanced from the magnetic sensor. Specifically, in a case where the board is fastened with a screw whose shank has, for example, a diameter of 2 mm and a length of 8 mm, it is desired that the board be fastened with the screw at a position distanced from the magnetic sensor by more than 15 mm. However, in this embodiment, in order to prevent the user's operation performed with respect to the operation button from influencing the measurement results of the magnetic sensor 21 and causing errors, one end of the board 20, which is on the side closer to the magnetic sensor 21, is purposely fixed. Accordingly, at least a distance from the magnetic sensor 21 to the screw 22a is equal to or less than 15 mm.

Further, in order to prevent the screws 22a and 22b disposed in the vicinity of the magnetic sensor 21 from influencing the measurement results of the magnetic sensor 21, the screws 22a and 22b may be formed of a non-magnetic material. Specifically, the screws 22a and 22b may be formed of such a non-magnetic metal material as phosphor bronze.

Note that, in this embodiment, the board 20 is fixed to the enclosure of the operation device 10 by fastening the screws 22a and 22b into the screw holes 24a and 24b, respectively, but the present invention is not limited thereto. For example, the board 20 may be fixed to the enclosure of the operation device 10 with a combination of a bolt and a nut as the fastening member. In this case, too, if at least the bolt is formed of a non-magnetic material, it is possible to reduce an influence on the magnetic sensor 21. Further, instead of directly fixing the board 20 to the enclosure of the operation device 10, the board 20 may be indirectly fixed to the enclosure of the operation device 10 through a method of fastening, with a screw, the board 20 to another part fixed to the enclosure of the operation device 10.

Next, description is given of an influence on the magnetic sensor 21, which is exerted by an operation performed on the trigger button 14 provided to the back side of the operation device 10, and of measures against the influence. The trigger button 14 is capable of detecting the amount of depression performed by the user as described above, and thus has a large movable range (stroke amount) with which the trigger button 14 is depressed by the user's operation, compared to the other operation buttons. Further, inside the trigger button 14, there is provided a spring 14a so that, when the user has released the depressed trigger button 14, the trigger button 14 returns to the original position (reference position) at which the trigger button 14 was before being depressed. The trigger button 14 has a large movable range, and hence, when the user performs operations of depressing and releasing the trigger button 14, the spring 14a moves significantly along with such operations as well.

Figure 8:
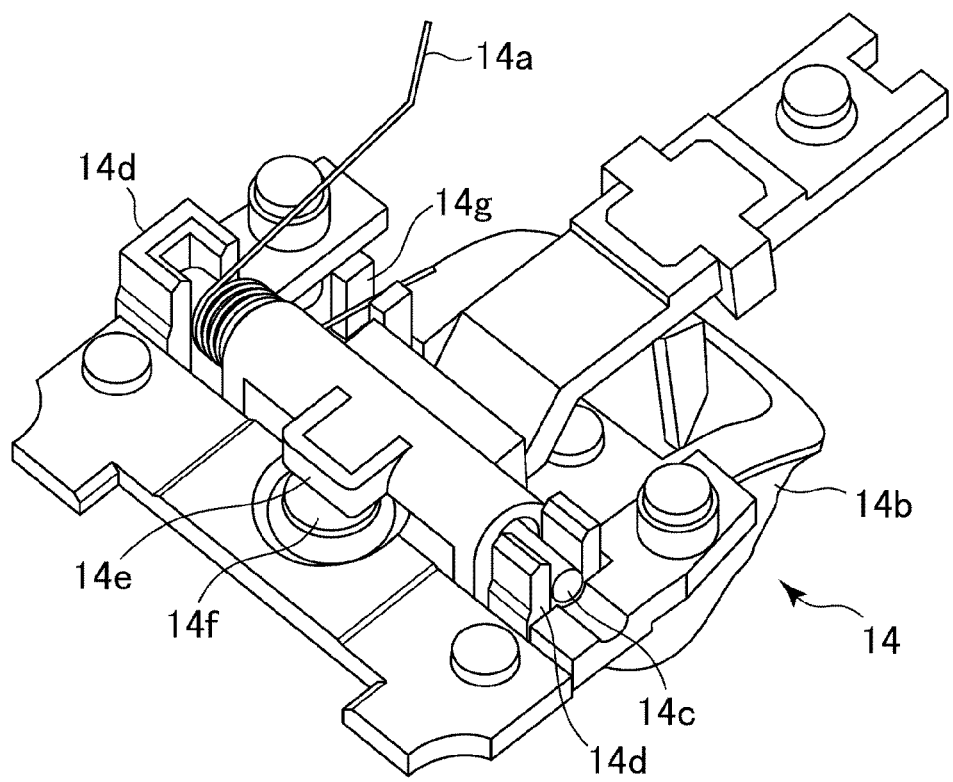
FIG. 8 is a view of an inner structure of a trigger button.

FIG. 8, which is provided for describing an inner structure of the trigger button 14, is a perspective view illustrating the trigger button 14 viewed from an inside of the main body portion 11. As illustrated in FIG. 8, a rotating shaft 14c is stationary held with respect to a main body 14b of the trigger button 14, and both ends of the rotating shaft 14c are placed on bearing portions 14d. When the user applies a force to the main body 14b of the trigger button 14, the main body 14b rotates about the rotating shaft 14c. With this rotation, a protruding portion 14e protruding from the main body 14b depresses a contact point 14f, and hence the operation device 10 detects the operation performed by the user with respect to the trigger button 14. Further, two plate-like members protrude from the main body 14b to form a spring supporting portion 14g having substantially a U-shape, and the spring 14a is disposed so as to pass through an inside of the spring supporting portion 14g and be wound around the rotating shaft 14c. Note that, the spring 14a is a helical torsion coil spring. Further, of both ends of the spring 14a, one end thereof which is not inserted into the spring supporting portion 14g is inserted into a spring fixing portion 14i provided to a board for trigger button 14h. With this structure, the one end of the spring 14a is fixed so as not to move even when the main body 14b is rotated. Here, the board for trigger button 14h is fixed to the back portion 11b constituting the enclosure of the operation device 10.

Figure 9:
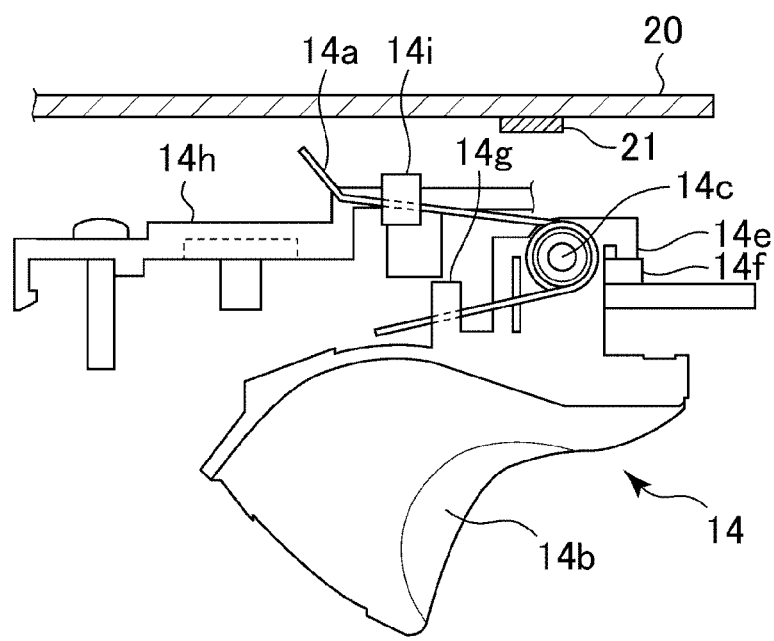
FIG. 9 is a diagram illustrating a positional relation between a spring integrated in the trigger button and the magnetic sensor when the trigger button is not being operated.
Figure 10:
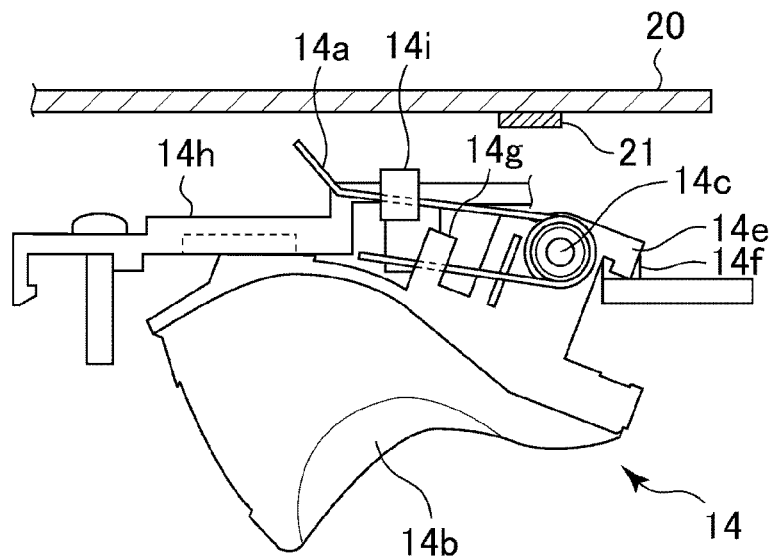
FIG. 10 is a diagram illustrating a positional relation between the spring integrated in the trigger button and the magnetic sensor when the trigger button is being operated by the user.
Figure 11:
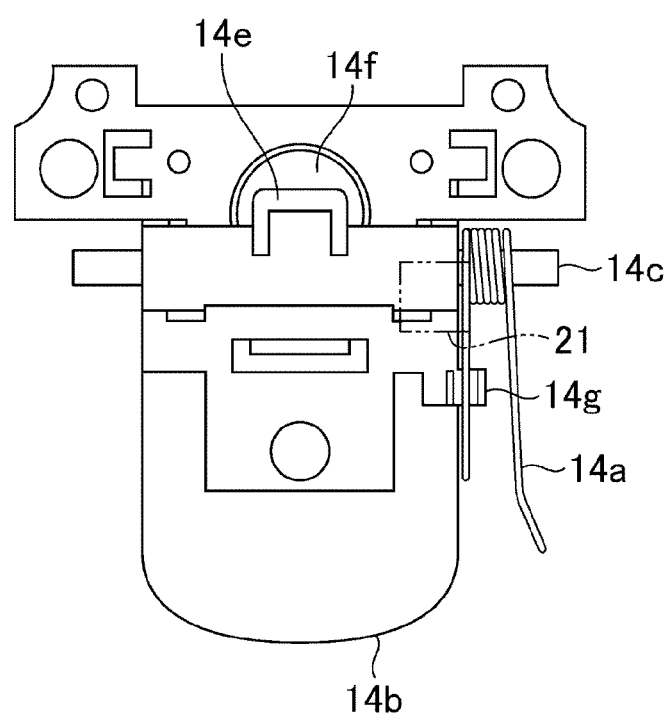
FIG. 11 is a diagram illustrating a positional relation between the spring integrated in the trigger button and the magnetic sensor when the operation device is viewed from a front thereof.

In this embodiment, components of the trigger button 14 are disposed on the same side of the board 20 as the side where the magnetic sensor 21 is disposed (back side), and the spring 14a, in particular, is disposed below the magnetic sensor 21 when viewed from the side surface of the operation device 10. FIG. 9, FIG. 10, and FIG. 11 are all diagrams illustrating positional relations between the magnetic sensor 21 disposed on the board 20 and the spring 14a. Specifically, FIG. 9 and FIG. 10 illustrate a disposition of main parts of the trigger button 14 when viewed from the side surface of the operation device 10. Further, FIG. 9 illustrates a state in which the user is not operating the trigger button 14 (reference state), whereas FIG. 10 illustrates a state in which the main body 14b is rotated to the limit through a depression operation performed by the user. As illustrated in FIGS. 9 and 10, when the user operates the trigger button 14, the spring supporting portion 14g also moves along with the rotation of the main body 14b, thereby pressing, in a direction toward the magnetic sensor 21, a portion of the spring 14a which extends from the rotating shaft 14c to the spring supporting portion 14g. Accordingly, as illustrated in FIG. 10, the barycenter of the spring 14a is positioned closer to the magnetic sensor 21. Further, when the user releases the trigger button 14 in the state illustrated in FIG. 10, the spring supporting portion 14g is pressed downward owing to a restoring force of the spring 14a, and the main body 14b returns to the reference state illustrated in FIG. 9. In other words, along with the user's operation, at least a part of the spring 14a is operated along the direction toward the magnetic sensor 21 (Z-axis direction). Further, FIG. 11 illustrates a disposition of the main parts constituting the trigger button 14 when viewed from the front side of the operation device 10, and the position of the magnetic sensor 21 in a planar view is indicated by a rectangle of chain double-dashed lines. As illustrated in FIG. 11, when the operation device 10 is viewed from the front side thereof (direction perpendicular to the surface of the board 20), the magnetic sensor 21 is disposed at a position that overlaps the components of the trigger button 14. In particular, when viewed from the front side of the operation device 10, a part of a right end of the magnetic sensor 21 overlaps a part of a left end of the spring 14a.

Here, if the spring 14a is formed of such a magnetic material as stainless steel, the operation of the spring 14a caused by the operation performed on the trigger button 14 conceivably influences the detection results of the magnetic sensor 21. As has been described above, it is desired that no magnetic material be placed in the vicinity of the magnetic sensor 21. However, particularly as for the spring 14a, even if the spring 14a is located at a position relatively distanced from the magnetic sensor 21, there is a fear that the spring 14a influences the detection results. This is because the spring 14a is an operation part whose relative position with respect to the magnetic sensor 21 changes during the use of the operation device 10. In view of the above, in this embodiment, the spring 14a is formed of a non-magnetic metal material. Specifically, in this embodiment, the spring 14a is formed of phosphor bronze. With the spring 14a formed of a non-magnetic material, it is possible to suppress influences on the measurement results of the magnetic sensor 21 which are exerted by the operation performed with respect to the trigger button 14.

Here, in the description above, the spring 14a is formed of phosphor bronze, but the present invention is not limited thereto. The spring 14a may be formed of another non-magnetic material. Further, in the description above, the spring 14a integrated in the trigger button 14 is formed of a non-magnetic material. However, apart from the trigger button 14, other operation buttons such as the main button 13 and the auxiliary buttons 15a to 15d may also be integrated with a spring formed of a non-magnetic material. Moreover, in addition to the spring integrated in the operation button, other operation parts may be formed of non-magnetic materials.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An operation device having a proximal end portion and a distal end portion, comprising:
    a reference position having a light emitting portion at the proximal end of the operation device, wherein the light emitting portion is used for detecting a location of the operation device;
    a magnetic sensor for detecting a posture of the operation device;
    an operation button used for operation input by a user; and
    a board, wherein:
    the board has a shape extending in one direction, and one end portion of the board is fixed to an enclosure of the operation device with a fastening member at the proximal end portion of the operation device;
    the magnetic sensor and a contact point of the operation button are both disposed at positions close to the one end portion of the board near the proximal end portion of the operation device; and
    the operation input by the user comprises a change in posture of the operation device.

2. The operation device according to claim 1, wherein the fastening member comprises a screw formed of a non-magnetic material.

3. The operation device according to claim 2, wherein the screw fixes the board at a position distanced from the magnetic sensor by 15 mm or shorter.

4. The operation device according to claim 1, wherein the fastening member fastens the board to the enclosure with a fastening force applied in a direction substantially parallel to an operation direction in which the user operates the operation button.

5. The operation device according to claim 4, wherein the fastening member fastens the board to the enclosure with the fastening force applied in a direction opposite to the operation direction.

6. The operation device according to claim 1, wherein the board has corner portions at the one of the end portion thereof fixed to the enclosure of the operation device.

* * * * *